United States Patent [19]

Dötsch et al.

[11] 4,273,810

[45] Jun. 16, 1981

[54] METHOD FOR PREVENTING SINTERING IN FORGING BLOCKS

[75] Inventors: Erwin Dötsch, Dortmund; Jürgen Pötschke, Essen; Ottmar Knacke, Aachen-Verlautenheide, all of Fed. Rep. of Germany

[73] Assignee: Brown, Boveri & Cie Aktiengesellschaft, Mannheim, Fed. Rep. of Germany

[21] Appl. No.: 57,312

[22] Filed: Jul. 13, 1979

[30] Foreign Application Priority Data

Jul. 14, 1978 [DE] Fed. Rep. of Germany ....... 2830921

[51] Int. Cl.$^3$ .............................................. B21J 1/06
[52] U.S. Cl. .................................... 427/156; 72/362; 148/12.1; 148/14; 427/427
[58] Field of Search .................. 148/12.1, 14, 6, 113, 148/22, 154; 106/304; 427/156; 428/469, 329

[56] References Cited

U.S. PATENT DOCUMENTS

| | | | |
|---|---|---|---|
| 637,369 | 11/1899 | Bradley | 148/14 |
| 1,029,936 | 6/1912 | Maskrey | 427/226 |
| 1,706,725 | 3/1929 | Boutillier | 148/12.1 |
| 2,413,949 | 1/1947 | Broverman | 148/113 |
| 2,641,556 | 6/1953 | Robinson | 148/113 |
| 3,523,837 | 8/1970 | Pavlik | 148/122 |

FOREIGN PATENT DOCUMENTS 1080655 8/1967 United Kingdom .

OTHER PUBLICATIONS

Geipel, Chem. Abs. 59P11041d, (1963).

*Primary Examiner*—Ralph S. Kendall
*Attorney, Agent, or Firm*—Herbert L. Lerner

[57] ABSTRACT

Preventing work pieces of iron or iron alloys in the form of a line of blocks which are pushed through an induction coil and heated to a forging temperature from sticking together. The surfaces of blocks which touch are subjected to an elevated temperature of heating and pressure due to pushing causing sintering with sticking. The application of a finely-divided material of predominantly iron oxide to the surfaces prevents sticking together of the surfaces when subjected to elevated temperature and pressure.

7 Claims, No Drawings

METHOD FOR PREVENTING SINTERING IN FORGING BLOCKS

BACKGROUND OF THE INVENTION

1. Field of the Invention

The invention relates to a method for preventing work pieces of iron or iron alloys, the surfaces of which touch each other at elevated temperature or simultaneously under mechanical pressure, from sticking together.

2. Background of the Invention

In inductive heating facilities for forgings, the material to be heated in the form of lined-up blocks of iron or iron alloys is pushed through the induction coil and is thereby heated to the forging temperature. In many cases, the individual blocks stick together at the touching end faces, which leads to disturbances in the operation.

The cause of this sticking-together is sintering of the metallic block ends which are pushed together. This sintering process is aided by the heating of the blocks to the forging temperature, by the contact pressure in pushing the blocks through the induction coil, and by the residence time of the blocks in the induction coil during which the temperature and the pressure are active. The atmosphere also has a substantial influence on the sintering process. At certain oxygen potentials and temperatures, oxygen is adsorbed on the iron surface in a chemisorption layer, which additionally activates the sintering process. The temperatures occurring in the heating device are of an order of magnitude which induces this activated sintering.

According to the present state of the art, the sintering-together of the metallic block ends is prevented by the application of a paste of high-melting, ceramic base materials, especially aluminum oxide, which spaces the metal surfaces of two adjacent forging blocks at high heating temperatures a sufficient distance, so that the sintering process mentioned above does not take place. A disadvantage of this method is that the ceramic components of such a paste, even if they are present in the most finely-divided form, lead to contamination at the forging and, over the long term, cause damage to the forging tool.

SUMMARY OF THE INVENTION

An object of the present invention is to provide a method of preventing work pieces of iron or iron alloys at elevated temperature with surfaces which touch each other from sintering, in a simple, reliable and inexpensive manner without the use of ceramics and the disadvantages connected therewith.

With the foregoing and other objects in view, there is provided in accordance with the invention a method for preventing work pieces of iron or iron alloys, the surfaces of which touch each other at elevated temperature and simultaneously under mechanical pressure, from sticking together, which comprises applying a finely-divided material of predominantly iron oxide, to the touching surfaces of the work pieces.

Other features which are considered as characteristic for the invention are set forth in the appended claims.

Although the invention is illustrated and described herein as embodied in a method for preventing sintering in forging blocks, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

In accordance with the invention, a material which consists of finely-divided iron oxide is applied to the touching surfaces. It is advantageously applied to the surfaces when they are still cold i.e. when the surfaces are at a temperature below 100° C., preferably at about ambient temperature.

Preferably, a paste prepared of water and screened iron scale or converter exhaust gas dust is applied to the surfaces of the work pieces, which will touch each other at high temperature. The application can advantageously be made by means of a spray gun operated with compressed air. The thickness of the layer of iron oxide on the surfaces should be sufficient to keep the surfaces apart when pushed through a heating unit. Ordinarily, a thickness of ⅛ inch or less is adequate but greater thickness may be employed.

Especially good results can be obtained if iron oxide with a grain size of between 0.05 and 0.5 mm is used.

One thereby obtains the following advantages: that the applied material and the material of which the surface of the work pieces itself consists, are identical; that the applied material occurs as a byproduct in steel making in the form of scale or exhaust gas dust and therefore is available in practically unlimited quantities at practically no cost; that the applied material can be processed with water without further measures to form a sprayable mass; and that the time and equipment requirements for applying the oxide layer are minimal. The thus prepared surfaces of the work pieces are reliably protected against sintering, and no trouble occurs in the further processing.

There are claimed:

1. Method for preventing lined-up work pieces of iron or iron alloys in a heating zone, the surfaces of which touch each other at elevated temperature and simultaneously under mechanical pressure, from sticking together, which comprises applying a finely-divided material of predominantly iron oxide, directly to the touching surfaces of the work pieces.

2. Method according to claim 1, wherein a paste prepared from water and screened iron scale is applied to the touching surfaces of the work pieces.

3. Method according to claim 1, wherein a paste prepared from water and converter exhaust gas dust is applied to the touching surfaces of the work pieces.

4. Method according to claim 1 or claim 2 or claim 3 wherein the iron oxide has a grain size of between 0.05 and 0.5 mm.

5. Method according to claim 1 or claim 2 or claim 3, wherein the iron oxide is applied by means of a spray gun operated with compressed air.

6. Method according to claim 1 or claim 2 or claim 3, wherein the finely-divided material is applied to the still cold surfaces which are at a temperature below 100° C.

7. Method according to claim 1 or claim 2 or claim 3, wherein the finely-divided material is applied to the still cold surfaces which are at about ambient temperature.

* * * * *